US008359281B2

(12) United States Patent
Cadambi et al.

(10) Patent No.: US 8,359,281 B2
(45) Date of Patent: Jan. 22, 2013

(54) SYSTEM AND METHOD FOR PARALLELIZING AND ACCELERATING LEARNING MACHINE TRAINING AND CLASSIFICATION USING A MASSIVELY PARALLEL ACCELERATOR

(75) Inventors: Srihari Cadambi, Princeton, NJ (US); Igor Durdanovic, Lawrenceville, NJ (US); Venkata Jakkula, Bordentown, NJ (US); Eric Cosatto, Red Bank, NJ (US); Murugan Sankaradass, Dayton, NJ (US); Hans Peter Graf, Lincroft, NJ (US); Srimat T. Chakradhar, Manalapan, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 628 days.

(21) Appl. No.: 12/478,073

(22) Filed: Jun. 4, 2009

(65) Prior Publication Data
US 2009/0304268 A1 Dec. 10, 2009

Related U.S. Application Data

(60) Provisional application No. 61/058,887, filed on Jun. 4, 2008, provisional application No. 61/146,498, filed on Jan. 22, 2009.

(51) Int. Cl.
*G06F 15/18* (2006.01)
(52) U.S. Cl. ......................................................... 706/12
(58) Field of Classification Search ..................... 706/12
See application file for complete search history.

(56) References Cited

U.S. PATENT DOCUMENTS

| 2005/0125369 | A1* | 6/2005 | Buck et al. ............... 706/12 |
| 2005/0197977 | A1* | 9/2005 | Buck et al. ............... 706/12 |
| 2008/0117220 | A1* | 5/2008 | Gorchetchnikov et al. ... 345/503 |

* cited by examiner

*Primary Examiner* — Kakali Chaki
*Assistant Examiner* — Ababacar Seck
(74) *Attorney, Agent, or Firm* — Joseph Kolodka; Paul Schwarz

(57) ABSTRACT

A method system for training an apparatus to recognize a pattern includes providing the apparatus with a host processor executing steps of a machine learning process; providing the apparatus with an accelerator including at least two processors; inputting training pattern data into the host processor; determining coefficient changes in the machine learning process with the host processor using the training pattern data; transferring the training data to the accelerator; determining kernel dot-products with the at least two processors of the accelerator using the training data; and transferring the dot-products back to the host processor.

21 Claims, 7 Drawing Sheets

SYSTEM AND METHOD FOR PARALLELIZING AND ACCELERATING LEARNING MACHINE TRAINING AND CLASSIFICATION USING A MASSIVELY PARALLEL ACCELERATOR

RELATED APPLICATIONS

This application claims the benefit of U.S. Provisional Application No. 61/058,887, filed Jun. 4, 2008, and U.S. Provisional Application No. 61/146,498, filed Jan. 22, 2009, the entire disclosures of which are incorporated herein by reference.

FIELD

The present disclosure relates to machine learning. More particularly, the present disclosure relates to a system and method for parallelizing and accelerating machine learning and classification.

BACKGROUND

Massively parallel architectures are required to reach the performances needed for the future applications of "recognition," "mining," and "synthesis." Massively parallel accelerators exist in the form of graphics processors with up to 256 processing elements, for synthesis applications. For the recognition and mining applications, however, nothing equivalent is available. These are application domains where machine learning dominates the computational requirements, and any meaningful acceleration has to focus on parallelizing machine learning.

The support vector machine (SVM) is an algorithm that falls within the classes of recognition and mining. The performance bottleneck in SVMs is the kernel computation, which involves multiplying a very large number of vectors (i.e., vector dot-products). This is not easily parallelizable on multi-core processors due to its massive memory bandwidth requirements.

Accordingly, a system and method is needed for parallelizing and accelerating machine learning and classification.

SUMMARY

A method is disclosed herein for training an apparatus to recognize a pattern. The method comprises: providing the apparatus with a host processor executing steps of a machine learning process; providing the apparatus with an accelerator including at least two processors; inputting training pattern data into the host processor; transferring the training data to the accelerator; determining coefficient changes in the machine learning process with the host processor using the training pattern data; transferring indices pertaining to one or more training vectors to the accelerator; determining kernel dot-products with the at least two processors of the accelerator using the training data; and transferring the dot-products back to the host processor.

Also disclosed herein is system for training an apparatus to recognize a pattern. The system comprises: a host processor of the apparatus for determining coefficient changes of a machine learning process from input training data; an accelerator including at least two processors for determining kernel dot-products using the training data; and at least one conduit for transferring the training data from the host processor to the accelerator and for transferring the kernel dot-products from the accelerator to the host processor.

Further disclosed herein is a method for recognizing patterns. The method comprises: providing host processor executing steps of a support vector machine learning process; providing an accelerator including at least two processors and a memory bank associated with each of the at least two processors; storing support vectors in the memory banks of the accelerator; reducing the precision of unlabeled pattern data with the host processor; transferring unlabeled pattern data from the host processor to the accelerator; calculating labels for the unlabeled pattern data with the at least two processors of the accelerator using the support vectors stored in the memory banks of the accelerator; and transferring the labeled pattern data back to the host processor.

DETAILED DESCRIPTION OF THE INVENTION

Disclosed herein is a host/coprocessor system and method for accelerating the training and operation of support vector machines (SVMs) and other machine learning methods/algorithms. SVMs are often used for machine recognition of patterns, such as automatic speech recognition, automatic text recognition, automatic image recognition, and automatic semantic classification of text. SVMs are also used for machine reasoning tasks including but not limited to analyzing recognized scenes and semantics. Sequential minimal optimization (SMO) methods/algorithms may be used in some embodiments of the system and method to accelerate both SVM training and classification.

The coprocessor-based accelerator may comprise a field-programmable gate array (FPGA), a programmable logic device (PLD), or an application-specific integrated circuit (ASIC). In one exemplary embodiment, the coprocessor-based accelerator of the system comprises a massively parallel FPGA (the term massively typically refers to at least 16 interconnected processing nodes—in one exemplary embodiment, the FPGA includes 128 interconnected processing nodes that are service by a distributed memory). The FPGA includes clusters of vector processing elements (VPEs) operating in single-instruction multiple data (SIMD) mode, which take advantage of large amounts of data parallelism in the application, i.e., where different processing nodes run the same instructions (program) on different data. The VPEs are mapped digital signal processors (DSPs) of the FPGA. The DSPs of the FPGA are used as parallel multiply-accumulators, i.e., as functional units specialized to the core computation of the SMO accelerated SVM. The host/coprocessor is adapted to implement a desired level of reduced arithmetic precision (e.g., reduced kernel arithmetic precision) to selectively increase hardware parallelism via the operation of the coprocessor. Low precision allows multiple operations per functional unit, and also increases the number of parallel off-chip memory loads and stores by packing multiple data words on the coprocessor's memory bus. The system and method allows a level of reduced arithmetic precision to be selected that is commensurate with a desired level of SVM recognition accuracy.

SVMs and other machine learning methods/algorithms have portions characterized by dense computation that are tolerant of low precision. In the present disclosure, this characteristic is used to partition the computation between a host computer and an accelerator of the coprocessor, transferring the dense, precision-tolerant computations on the accelerator of the coprocessor and the remaining computations on the host computer.

Figure 1:
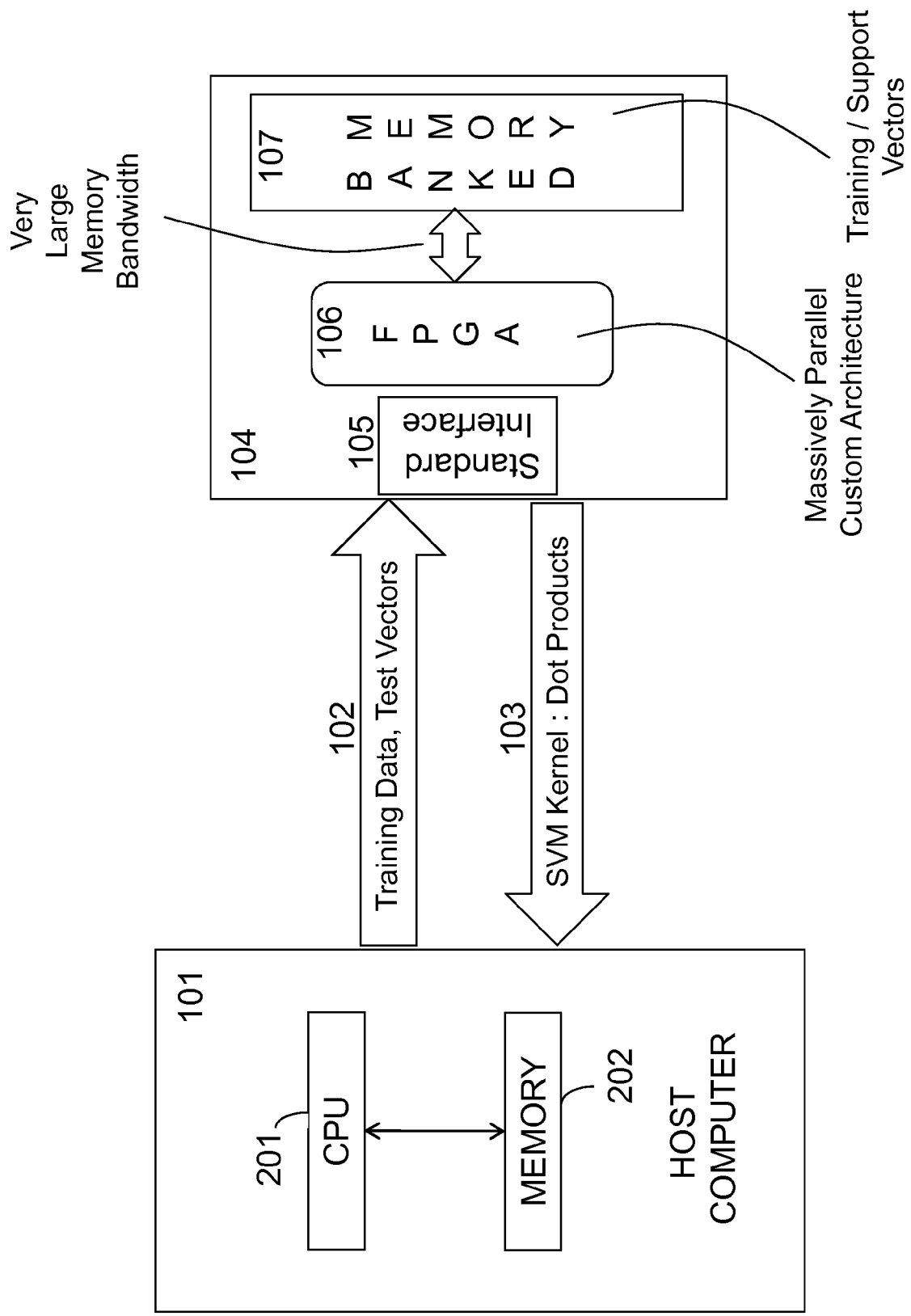
FIG. 1 is a block diagram of an exemplary embodiment of a host/FPGA-coprocessor system according to the present disclosure.

FIG. 1 is a block diagram of an exemplary embodiment of a host/FPGA-coprocessor system 100 for executing the precision reduction-based partitioning and parallelization method of the present disclosure. The system 100 generally includes a host computer 101 for executing the machine learning method and a field programmable gate array (FPGA) accelerator 104. A first conduit 102 is provided between the host computer 101 and the accelerator 104 for transferring machine learning training data, support vectors, and/or test vectors to the accelerator 104. In one exemplary embodiment, the first conduit 102 may be a conventional peripheral component interface (PCI) or like computer bus. A second conduit 103 may be provided between the host computer 102 and the accelerator 104 for transferring results from the accelerator 104 to the host computer 102. The results include, but are not limited to, SVM kernel dot products. In one exemplary embodiment, the second conduit 103 may also be a conventional PCI or like computer bus. In another exemplary embodiment, the machine learning training data, support vectors, test vectors and the results may be multiplexed and transferred over a single conduit (not shown).

The host computer 101 of the system 100 may include, without limitation, a mainframe computer system, a workstation, a personal computer, a personal digital assistant (PDA), a distributed computer system, or other device or apparatus having one or more control processing units (CPUs) that execute instructions from one or more memory mediums. The host computer 101 includes, in the exemplary embodiment of FIG. 1, a central processing unit or processor 201 and a memory medium 202 on which one or more computer programs or software components may be stored, which are executable to perform the SMO and SVM methods described herein. The memory medium may include, without limitation, CD-ROMs, floppy disks, tape devices, random access memories such as but not limited to DRAM, SRAM, EDO RAM, and Rambus RAM, non-volatile memories such as, but not limited hard drives and optical storage devices, and combinations thereof. The accelerator 104 of the system 100 may include a conventional communication interface 105 (e.g., a direct memory access (DMA) interface), a FPGA 106, and a banked memory 107.

Figure 2:
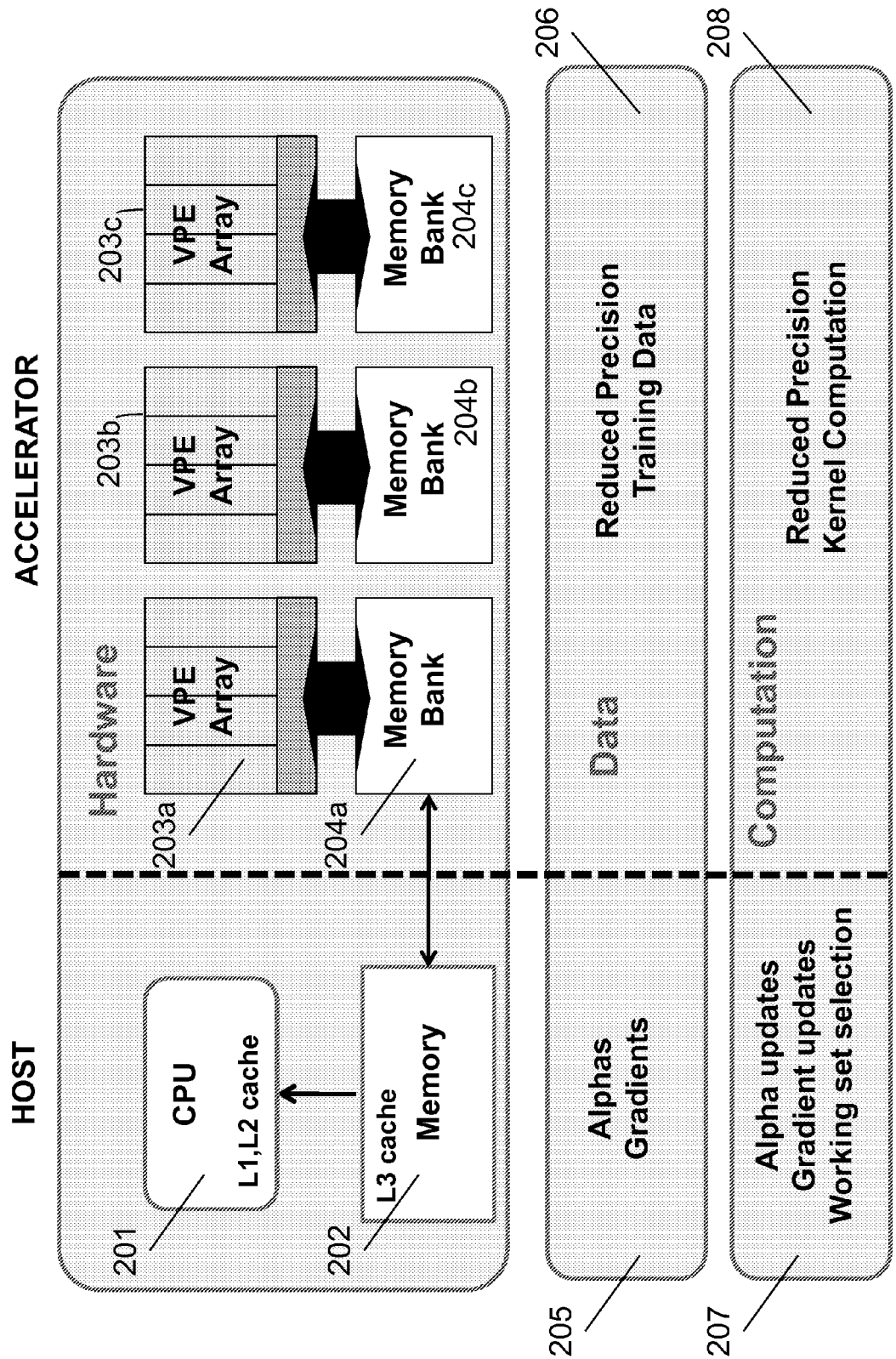
FIG. 2 is a diagram showing how the host/FPGA-coprocessor hardware, data, and computations are partitioned in accordance with an exemplary embodiment of the present disclosure.

Referring now to FIG. 2, the FPGA 106 may include an array of virtual processing elements (VPEs) 203a-c that communicate with a plurality of memory banks 204a-c defined by the banked memory 107. The memory banks 204a-c are in close proximity to the VPEs 203a-c to provide low access latency. A large bandwidth (e.g., more than about 3-5 gigabytes (GB) per second(s)) communication path 108 is provided between the FPGA 106 and the banked memory 107. In one exemplary embodiment, the communication path 108 has a bandwidth of about 15 GB/s.

The method of the present disclosure partitions the SMO-SVM algorithm (computations and data) between the host computer 101 and the accelerator 104 of system 100. More specifically, the CPU 201 of the host computer 101 executes certain portions (precision-intolerant portions) of the SMO-SVM algorithm and the VPEs 203 of the FPGA 106 computes kernel dot-products, i.e., the dense, precision-tolerant computation portions of the SMO-SVM algorithm. Training data and support vectors are placed in the board memory 107 by the interface 105, and kernel dot-products are returned to the host computer 101 each iteration.

FIG. 2 also shows the partitioning of hardware, data, and computation according to an exemplary embodiment of the present disclosure. At the hardware level, the CPU 201 and memory 202 of the host computer 101, are partitioned from the VPEs 203a-c and corresponding memory banks 204a-c of the accelerator 104. At the data level, alphas and gradients 205 in the SMO-SVM algorithm reside on the host computer while training data and support vectors 206 reside on the accelerator 104. At the computation level, the host computer computes alpha updates, gradient updates, and working set selections (next working set) 207 of the SMO-SVM algorithm and the accelerator 104 computes kernel dot-products 208 of the SMO-SVM algorithm.

The accelerator addresses the bottleneck of computing a large number of dot-products. Each dot-product computation is offloaded to the accelerator after reducing precision of the training/test vectors. The results produced by the accelerator are further reduced in precision and uploaded back to the host computer. Reducing precision makes the dot-product computation more parallelizable since it allows better use of the limited bandwidth typically present between off-chip memory and the processing elements. Given N training vectors, the goal of the SMO-SVM algorithm is to obtain a much smaller number of support vectors that can then be used to classify an arbitrary vector.

Figure 3:
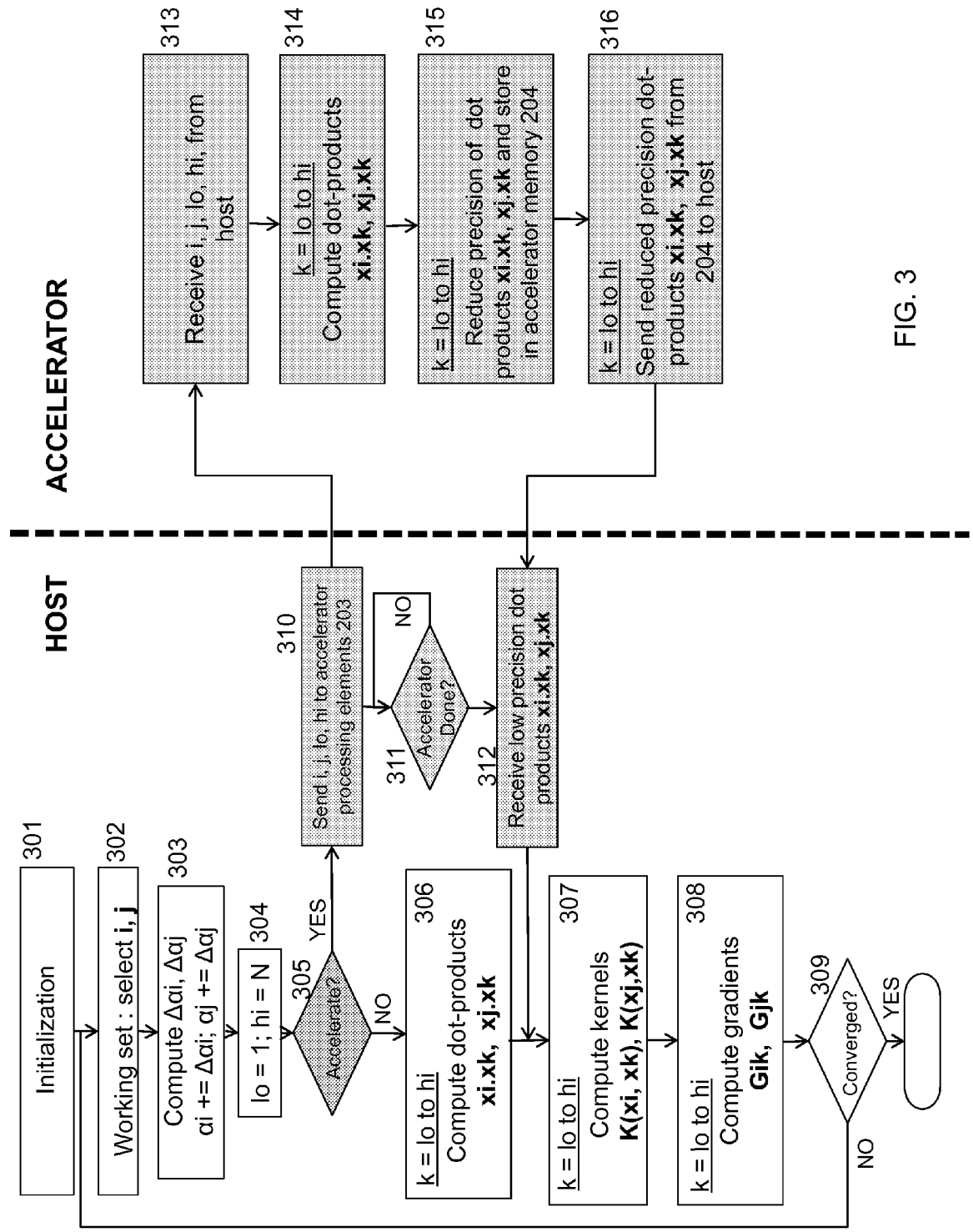
FIG. 3 is a flow chart of an exemplary embodiment of a method for training an SMO-SVM algorithm using the FPGA/host-based coprocessor system.

FIG. 3 is a flow chart showing an exemplary embodiment of a method for training an SMO-SVM algorithm using the host/coprocessor system. Boxes 301-312 and boxes 306-309 of the method represent the conventional steps of the SMO-SVM algorithm that run on the processor of the host computer, hereinafter referred to as "host." Boxes 305-312 represent the steps of the method relating to the accelerator that run on the host. Boxes 313-316 are the steps of the method that run on the accelerator of the coprocessor. The method commences in box 301 on the host with the initialization of the SMO-SVM algorithm. Then, in each iteration loop, two training vectors i, j of a working set are selected in box 302, changes in the algorithm's alphas $\alpha i$ and $\alpha j$ are computed on the host in box 303, and the number of training vectors is identified in box 304. The training vectors are obtained from labeled training pattern data (e.g., speech data, text data, image data, semantic textual data) inputted into the host. In box 305, a decision is made as to whether to use either the accelerator. This decision may be made by a user of the system or made automatically. In one exemplary embodiment, the decision in box 305 can be made automatically by using hardware probes to monitor system performance. If the performance falls below a certain threshold, the accelerator is activated. If the decision is to not use the accelerator, the method moves on to boxes 306-309, i.e., the dot-products of xi and xj with all training vectors are computed on the host in box 306, the kernels K(xi,xk) and K(xj,xk) are computed on the host for all k (an index) in box 307, the gradients Gik and Gjk for each xk are computed on the host in box 308, and then a decision as to whether to converge is made on the host in box 309. If the decision in box 309 is to converge, then the host converges to a class assignment that minimizes misclassification error (support vectors are determined), thereby completing the training of the SVM. If the decision in box 309 is to not converge, the method goes back to box 302 for another iteration loop. The decision in box 309 is performed using the well known KKT convergence criteria of the SMO-SVM algorithm.

If the decision in box 305 is to user the accelerator, the arithmetic precision of the training vectors is reduced by the host, and the reduced or low precision training vectors and training vector indices i, j, lo, and hi (host data) are transferred from the host to the accelerator by a conduit (no further precision reductions are made once the training vectors are transferred to the accelerator, and in further iterations of this step only the training vector indices are transferred to the accelerator). In one exemplary embodiment, precision is reduced by discarding the appropriate number of least significant bits (LSB). For example, but not limitation, a 16 bit fixed point number may be expressed in 4 bits thereby discarding the LSB, i.e., 12 bits. In box 313, the accelerator receives the host data and in box 314, the accelerator computes the SMO-SVM dot-products xi.xk, xj.xk (portion of kernels K(xi, xk) and K(xj,xk) on low precision training data. The multiplication in 314 produces results that have a higher resolution or precision than needed. For example but not limitation, an 8 bit*8 bit dot product computation produces a result having a 16 bit resolution, which may be higher than is necessary. Therefore, in box 315, the accelerator reduces the arithmetic precision of the dot products xi.xk, xj,xk computed in box 314 and stores them in the accelerator's one or more memory banks 204a-c (FIG. 2). Precision reduction of the dot products may be accomplished, in one exemplary embodiment, by separately calculating the hi-lo dot products for each of i and j (i.e., dot-product [i][k]=x[i]·x[k] and dot-product [j][k]=x[j]·x[k]) and discarding the appropriate number of least significant bits (LSB). For example, but not limitation, a result having 16 bit fixed point number may be expressed in 4 bits thereby discarding the LSB, i.e., 12 bits. If hi is 1 million and lo is 0, then 2 million dot-products are calculated in every iteration. The goal of precision reduction is to: 1) reduce communication bottlenecks, and 2) increase parallelism. Reducing training data precision allows more functional units to operate in parallel on the accelerator since more low precision words can be transferred from the memories (e.g. memories 204) to the processors (e.g., processors 203) for every unit of time. Reducing the dot-product precision allows more effective use of the accelerator-host conduit. In box 316 the accelerator retrieves the reduced precision SVM-SMO kernel dot products xi.xk, xj,xk from the accelerator's one or more memory banks and transfers them back to the host via the conduit mentioned earlier or a second conduit.

In box 311, a polling mechanism provided on the host checks to determine if the accelerator has completed the computing of the reduced precision kernel dot-products of the SMO-SVM algorithm. The polling mechanism may perform this function by monitoring a location in the host's memory that is mapped to the accelerator by a device driver (not shown). Specifically, the device driver and host operating system maps a certain portion of a virtual memory to the accelerator. Anything written to that portion of the memory will then be interpreted by the operating system as relevant to the hardware, and relayed to the device driver for specific action.

In box 312 the host receives the reduced precision SVM-SMO kernel dot products xi.xk, xj,xk from the accelerator's one or more memory banks via the conduit. The reduced precision SVM-SMO kernel dot products xi.xk, xj,xk are placed in the memory of the host by direct memory access. The method then continues in boxes 307-309 as previously described. Specifically, the reduced precision kernel dot-products of xi.xk, xj.xk are used by the host in box 307 to complete the computation of the kernels K(xi,xk) and K(xj, xk) for all k. The kernels K(xi,xk) and K(xj,xk) are used by the host to compute the gradients Gik and Gjk for each xk in box 308. In box 309, a decision as to whether to converge is made on the host in box 309. If the decision in box 309 is to converge, then the host converges, as discussed earlier, to a class assignment that minimizes misclassification error (support vectors are determined), thereby completing the training of the SVM. If the decision in box 309 is to not converge, the method goes back to box 302 for another iteration loop.

Figure 4A:
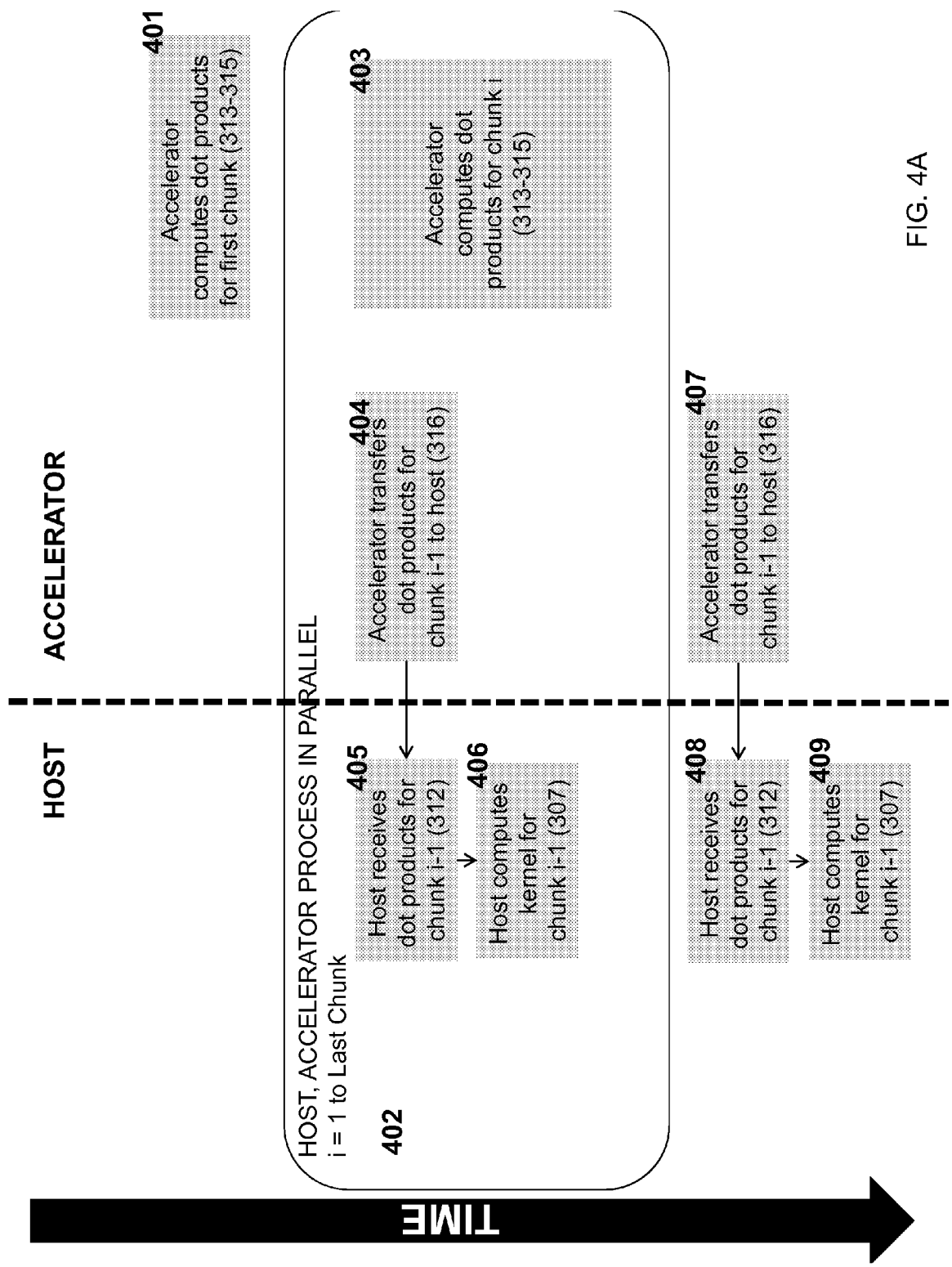
FIG. 4A is a flow chart of an exemplary embodiment of a method for chunking the training data according to the present disclosure.
Figure 4B:
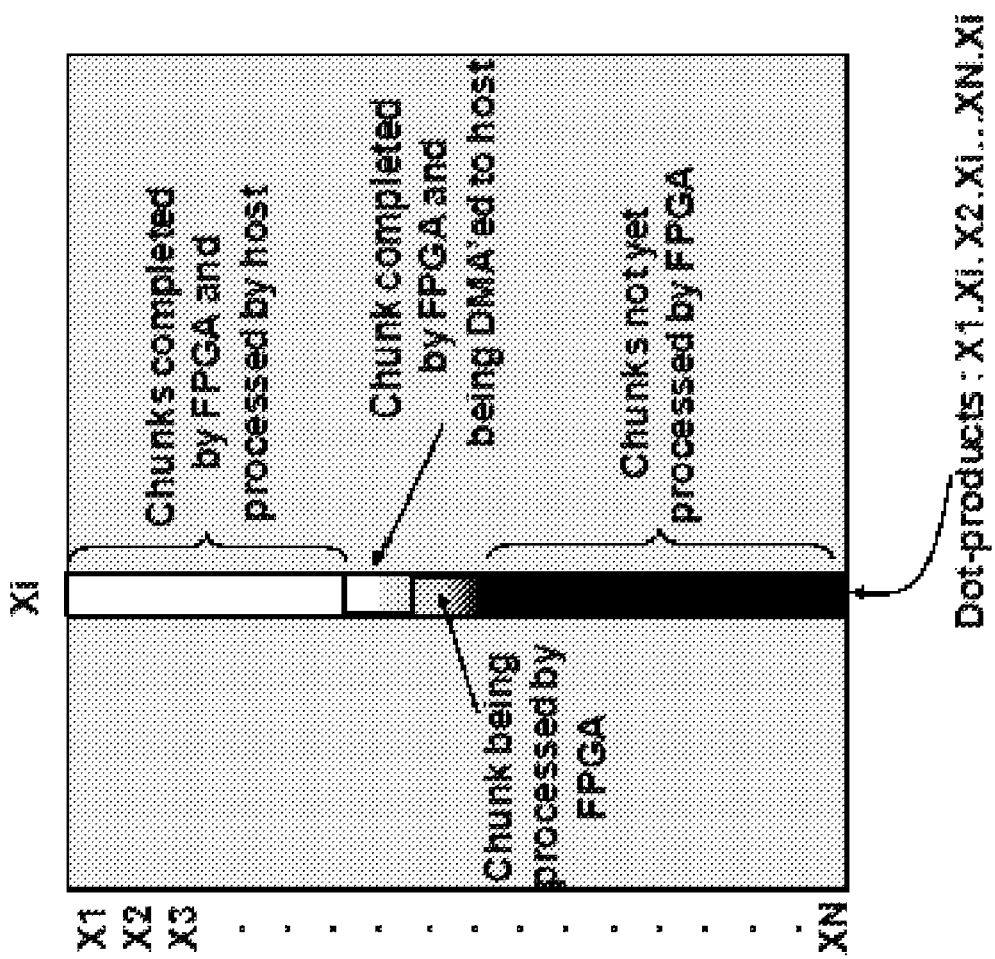
FIG. 4B is a diagrammatic view of the method of FIG. 4B

Referring collectively to FIGS. 4A and 4B, are diagrams, which illustrate an exemplary embodiment of a chunking method that may be used to further increase performance of the method for training an SMO-SVM using the host/coprocessor system. The chunking method, the steps of which are specified and implemented by the host with support from the accelerator, divides a computation into smaller, independent portions so that the host and accelerator may be parallelized. Specifically, once the accelerator computes the dot-products for a "chunk" of data specified by the host, as shown in boxes 401 and 403 and transfers the dot-products for the chunk of data to the host, as shown in boxes 404 and 407, the host has to receive the dot-products for the chunk of data, as shown in boxes 405 and 408 and compute the remainder of the kernel K, as shown in boxes 406 and 409. Accordingly, the host process may overlap the accelerator process using chunks, as shown in box 402. The result column shown in FIG. 4B is divided into "chunks" so that while the accelerator processes a chunk, as shown in box 403 of FIG. 4A, the previous chunk is being transferred to the host in box 404 and received by the host in box 405. This effectively hides the host-accelerator communication latency as well as any processing the host performs on the chunk.

Figure 5:
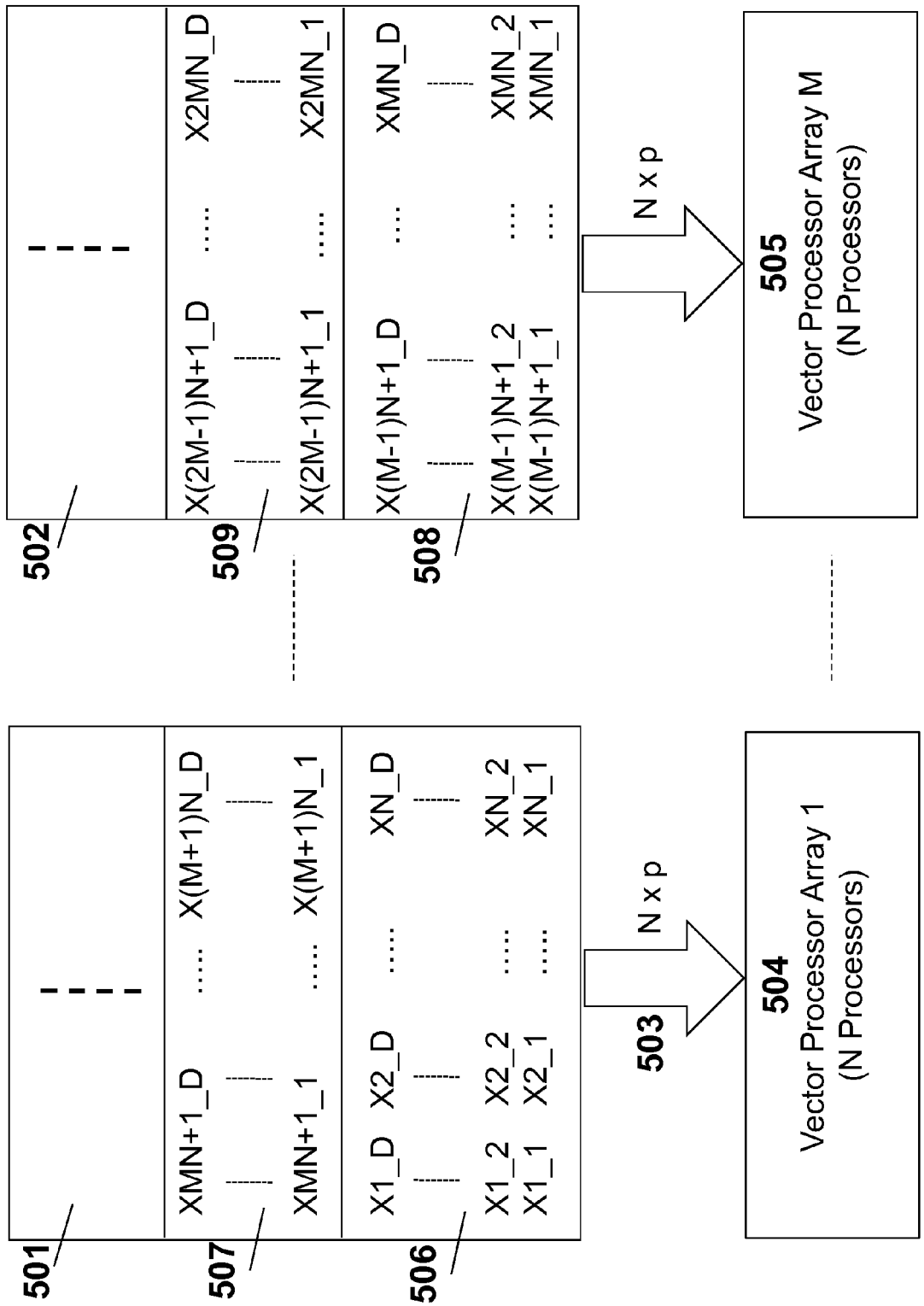
FIG. 5 is a diagrammatic view of an exemplary embodiment of a packing method according to the present disclosure.

FIG. 5 is a block diagram showing an exemplary embodiment of a method for packing low precision SVM training and support vectors in the accelerator's one or more memory banks. The packing method is implemented by the host and allows for utilization of the limited off-chip memory bandwidth. Block 501 is off-chip memory bank 1 (one of the memory banks 204a-c shown in FIG. 2), servicing vector processor array 1 (one of the VPEs 203a-c shown in FIG. 2). Block 502 is off-chip memory bank M (another one of the memory banks 204a-c shown in FIG. 2), servicing vector processor array M (another one of the VPEs 203a-c shown in FIG. 2). Block 503 is a conduit (communication path 108 in FIG. 1) between the off-chip memory bank (banked memory 107 in FIG. 1) and vector processor cluster (FPGA 106 in FIG. 1). The width of this is N×p bits where N is the size of the vector processor array and p is the resolution (precision) in bits. Block 504 is vector processor array 1. Block 505 is vector processor array M. Block 506 is an arrangement of N training or support vectors, each of dimension D and precision p. Each row in the memory represents the size of a memory fetch. The first N vectors are arranged in this portion. Block 507 is the next set of N vectors (vector MN+1 to vector (M+1)N) in memory bank 1. Block 508 is a set of N vectors (vector (M−1)N+1 to vector MN) in memory bank M. Block 509 is a set of N vectors (vector (2M−1)N+1 to vector 2MN) in memory bank M.

Figure 6:
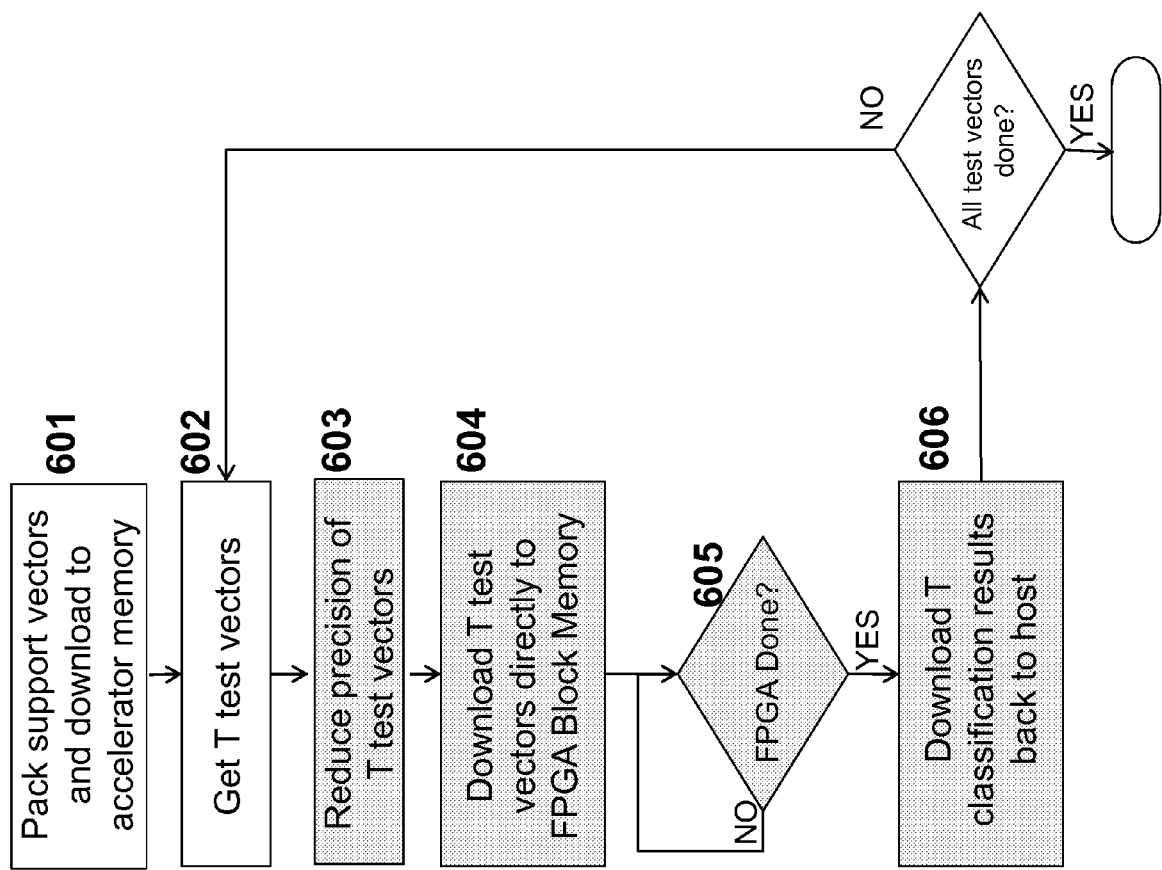
FIG. 6 is a flow chart of an exemplary embodiment of a method for performing SVM classification (or testing) using reduced precision on the accelerator of the host/FGPA-coprocessor.

FIG. 6 is a flow chart showing an exemplary embodiment of a method for performing SVM classification (or testing) using reduced precision on the accelerator of the coprocessor. Once the support vectors are determined via the training method of FIG. 3, they may be used to classify or label "test vectors", which are vectors that have unknown or unlabeled classes. Once support vectors for a database of labeled patterns, for example but not limitation, handwritten digits, are determined, test vectors for a new unlabeled pattern (e.g., unlabeled handwritten digits) not in the training database may be obtained using the method of FIG. 6.

The method commences in box 601 wherein the support vectors obtained from training are packed into the accelerator memory. In box 602, T test vectors generated in the host. In box 603, the host reduces the precision of the T test vectors to match the precision of the hardware processing elements of the accelerator. In box 604, the T reduced precision test vectors are transferred to the banked memory 107 (FIG. 1) of the accelerator. In box 603, the host polling mechanism determines whether accelerator has completed the classification or labeling of the T test vectors. If the accelerator has not completed the classification, no T results corresponding to the T test vectors are transferred back to the host. If the accelerator has completed the classification, then in box 604, the accelerator transfers the T results corresponding to the T test vectors back to the host. In box 607, the host determines whether all the T test vectors have been classified. If all T test vectors have not been classified, the method loops back to for another iteration of the boxes 602-607. If all T test vectors have been classified, the host processor causes the classification results to be communicated to a user in any suitable manner. For example, but not limitation, the host processor may cause the classification results to be graphically displayed on a display monitor (not shown) of the system.

Although the system and method have been described in terms of exemplary embodiments, it is not limited thereto. Rather, the appended claims should be construed broadly, to include other variants and embodiments of the system and method, which may be made by those skilled in the art without departing from the scope and range of equivalents of the system and method.

What is claimed is:

1. A method for training an apparatus to recognize a pattern, the method comprising the steps of:
    providing the apparatus with a host processor executing steps of a machine learning process;
    providing the apparatus with an accelerator including at least two processors;
    inputting training data into the host processor;
    reducing the precision of the training data with the host processor
    transferring the training data with reduced precision to the accelerator;
    determining coefficient changes in the machine learning process with the host processor using the training data with reduced precision;
    transferring indices pertaining to one or more training vectors to the accelerator
    determining kernel dot-products with the at least two processors of the accelerator using the training data with reduced precision; and
    transferring the dot-products back to the host processor.

2. The method of claim 1, further comprising the step of determining kernels of the machine learning process with the host processor using the kernel dot-products.

3. The method of claim 2, further comprising the step of determining gradients of the machine learning process with the host processor using the kernels.

4. The method of claim 1, wherein the step of reducing the precision of the training data with the host processor is performed prior to the step of transferring the training data to the accelerator.

5. The method of claim 4, further comprising the step of reducing the precision of the dot-products with the accelerator prior to the step of transferring the dot-products back to the host processor.

6. The method of claim 1, further comprising the step of reducing the precision of the kernel dot-products with the accelerator prior to the step of transferring the dot-products back to the host processor.

7. The method of claim 6, wherein the accelerator further includes a memory bank associated with each one of the at least two processors, and further comprising the step of partitioning the reduced precision kernel dot-products into groups and storing each of the groups of the kernel dot-products in one of the memory banks prior to the step of transferring the kernel dot-products back to the host processor.

8. The method of claim 1, wherein the kernel dot-products are determined in a parallel manner with the at least two processors of the accelerator.

9. The method of claim 1, wherein the kernel dot-products are determined in separate and discrete chunks.

10. The method of claim 1, wherein the accelerator further includes a memory banks associated with each one of the at least two processors, and further comprising the step of partitioning the kernel dot-products into groups and storing each of the groups of the kernel dot-product in one of the memory banks prior to the step of transferring the kernel dot-products back to the host processor.

11. A system for training an apparatus to recognize a pattern, the system comprising:
    a host processor of the apparatus for determining coefficient changes of a machine learning process from input training data and for reducing the precision of the training data;
    an accelerator including at least two processors for determining kernel dot-products using the training data with reduced precision received from the host processor; and
    at least one conduit for transferring the training data with reduced precision from the host processor to the accelerator and for transferring the kernel dot-products from the accelerator to the host processor.

12. The system of claim 11, wherein the host processor uses the kernel dot-products to determine kernels of the machine learning process.

13. The system of claim 12, wherein the host processor uses the kernels to determine gradients of the machine learning process.

14. The system of claim 11, wherein the host processor reduces the precision of the training data prior to its transfer to the accelerator.

15. The system of claim 14, wherein the accelerator reduces the precision of the kernel dot-products prior to their transfer to the host processor.

16. The system of claim 11, wherein the accelerator reduces the precision of the kernel dot-products prior to their transfer to the host processor.

17. The system of claim 16, wherein the accelerator further includes a memory bank associated with each one of the at least two processors, and wherein the kernel dot-products are partitioned into groups and each of the groups of the kernel dot-products are stored in one of the memory banks prior to being transferred to the host processor.

18. The system of claim 11, wherein the kernel dot-products are determined in a parallel manner by the at least two processors of the accelerator.

19. The system of claim 11, wherein the kernel dot-products are determined in separate and discrete chunks.

20. The system of claim 11, wherein the accelerator further includes a memory bank associated with each one of the at least two processors, and wherein the kernel dot-products are partitioned into groups and each of the groups of the kernel dot-products are stored in one of the memory banks prior to being transferred to the host processor.

21. A method for recognizing patterns, the method comprising the steps of:

providing host processor executing steps of a support vector machine learning process;

providing an accelerator including at least two processors and a memory bank associated with each of the at least two processors;

storing support vectors in the memory banks of the accelerator;

reducing the precision of unlabeled pattern data with the host processor;

transferring unlabeled pattern data from the host processor to the accelerator;

calculating labels for the unlabeled pattern data with the at least two processors of the accelerator using the support vectors stored in the memory banks of the accelerator;

and transferring the labeled pattern data back to the host processor.

* * * * *